United States Patent [19]
Reichert

[11] 3,854,281
[45] Dec. 17, 1974

[54] HOURMETER FOR EQUIPMENT HAVING SHORT OPERATING TIMES

[75] Inventor: Heinz Reichert, Neviges, Germany

[73] Assignee: Eaton Corporation, Cleveland, Ohio

[22] Filed: Sept. 26, 1973

[21] Appl. No.: 401,013

[30] Foreign Application Priority Data
Jan. 31, 1973  Germany............................ 2304479

[52] U.S. Cl.................. 58/145 R, 58/39.5, 324/189
[51] Int. Cl............................ G04f 9/06, G04b 5/20
[58] Field of Search...................... 58/39.5, 145–147; 324/181, 189; 235/92 T

[56] References Cited
UNITED STATES PATENTS
| | | | |
|---|---|---|---|
| 2,972,107 | 2/1961 | Criswell........................... | 58/39.5 X |
| 3,275,850 | 9/1966 | Arseneau........................ | 58/39.5 X |
| 3,299,627 | 1/1967 | Hart et al........................ | 58/39.5 X |

Primary Examiner—Edith Simmons Jackmon
Attorney, Agent, or Firm—Teagno & Toddy

[57] ABSTRACT

An hourmeter for indicating accurate total operating times of electrical machinery operating in short and intermittent cycles is provided by the following assembly. A digitally indicating means including a pulse counter is series connected with a switching means including a programmable unijunction transistor and an electric storage means including a capacitor. The capacitor of the storage means charges to a predetermined level during the intermittent operation of the electrical machinery and upon reaching the predetermined level actuates the programmable unijunction transistor and is discharged therethrough. The programmable unijunction transistor in turn with the aid of a thyristor actuates the indicating means which provides a readable indication of the total operating time of the electrical machinery. The discharged storage means is then again charged by the intermittent operation of the electrical machinery to the predetermined level and the above outlined cycle repeats itself to provide an updated indication of the operating time to the indicating means.

11 Claims, 2 Drawing Figures

PATENTED DEC 17 1974 3,854,281

HOURMETER FOR EQUIPMENT HAVING SHORT OPERATING TIMES

BACKGROUND OF THE INVENTION

1. Field of the Invention

The present invention relates to hourmeters generally and particularly to an hourmeter for equipment having short and intermittent operating times. Such equipment includes battery-operated vehicles such as electric trucks, lift trucks, tractors and others.

2. Description of the Prior Art

Hourmeters are used on vehicles such as electric trucks and fork lift trucks to record and indicate the actual operating time of various vehicle machinery. Prior art hourmeters were generally operated by a spring-actuated clockwork mechanism which had a usual running time of between 40 and approximately 120 seconds. The running time generally depended on the make and type of the clockwork mechanism. The spring of the clockwork mechanism was rewound by means of an electromagnet excited by steady voltage applied to the electromagnet from the operating vehicle. A switch contact was automatically closed upon relaxing of the aforementioned spring to allow the voltage from the vehicle to excite the electromagnet. These prior art hourmeters used mechanical means such as springs and switches to record and indicate operating time and were subject to the frailties usually associated with mechanical devices.

The use of these prior art hourmeters produced various problems such as poor accuracy and short life especially when these hourmeters were used to record operating times of vehicles having short and intermittent machinery operating cycles. When vehicle machinery was operated with extremely short operating times of only a few seconds, as in vehicles whose machinery is of the type mainly used as traction motors or pump drives, the prior art hourmeters recorded excessive operating times. This problem became even more critical when the hourmeters were parallel connected with the motors, and drives with their related contactors.

It is the object of the present invention, therefore, to provide an electric hourmeter which operates reliably and accurately in recording operating times of machinery having short and intermittent operating cycles.

It is another object of the present invention to provide an electric hourmeter having electrical storage means, switching means, and indicating means to provide reliable and accurate performance as well as extend operating life.

It is another object of the invention to provide an hourmeter having means to stabilize the signal provided to the hourmeter from the electrical machinery and compensating means to balance any temperature variations of the storage means of the hourmeter.

These and other objects of the present invention will become apparent from the drawings and the description of a preferred embodiment of the present invention.

SUMMARY OF THE INVENTION

In accordance with the present invention, an hourmeter is disclosed for indicating the elapsed operating time of electrical equipment which operates in short and intermittent cycles. During the operating part of the equipment cycle, an electrical signal is produced by the electrical equipment which signal is sensed by the hourmeter to provide an indication of the total operating time of the electrical equipment. To accomplish the above-mentioned function the hourmeter includes storage means, switching means and indicating means.

The storage means includes a capacitor which is charged by way of a resistor during the operating part of equipment cycle to a predetermined level. Upon reaching this predetermined level, the storage means provide a signal to the switching means. The switching means discharges the capacitor of the storage means when the capacitor is charged to the predetermined level. The switching means also simultaneously emits a control signal which is received by the indicating means to provide an indication of the total operating time of the electrical equipment.

The switching means preferably includes a programmable unijunction transistor across which the capacitor is discharged and which provides the control signal with the aid of a thyristor to the indicating means.

The indicating means which indicates the total operating time of the equipment, is preferably an electromechanical pulse counter having a digital display which is actuated by the control signal from the programmable unijunction transistor.

Additional features of the present invention include a Zener diode which charges the capacitor of the storage means through an associated resistor to, thereby, stabilize the electrical signal from the electrical machinery. Further, any temperature dependence of the capacitor's storage capacity is balanced by a temperature-dependent resistor connected to the programmable unijunction transistor.

From the foregoing it may be seen that the present invention provides numerous advantages over the prior art hourmeters. For one, extremely short operating times of the electrical equipment connected to the hourmeter are reliably and accurately detected because of the integrating function of the capacitor of the storage means. Furthermore, the hourmeter, with the possible exception of the indicating means, is exclusively composed of electronic solid state modules and is, therefore, particularly suited for use under extreme mechanical stress, as in the case of electrical equipment associated with vehicles such as electric trucks. These and other advantages of the present invention will become apparent upon a reading and appreciation of the preferred embodiment of the present invention.

DESCRIPTION OF THE PREFERRED EMBODIMENT

Figure 1:
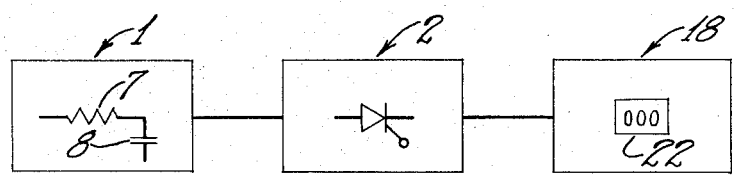
FIG. 1 depicts a block diagram of the hourmeter of the present invention.

Referring now to the drawings which depict a preferred embodiment of the present invention, it is seen that a circuit diagram for a solid state hourmeter is disclosed therein for accurately indicating the total elapsed operating time of any intermittently operating electrical machinery connected thereto.

Referring particularly to FIG. 1, it is seen that the hourmeter includes a storage means 1 in which a capacitor 8 is charged by way of a resistor 7 to a predetermined level during the operating cycle of any electrical equipment connected to the storage means 1. This equipment includes electrical machinery of an electric vehicle (not shown). A switching means 2 is connected to the storage means 1 and discharges the capacitor 8 of the storage means 1 whenever the capacitor 8 is charged to a predetermined level. The switching means 2 emits a control signal in response to the predetermined level of the capacitor 8 to an indicating means 18 which receives the control signal to provide an indication of the elapsed time of vehicle operation. The storage means includes an RC combination, including a resistor 7 and the capacitor 8, having a time constant such that the resulting charging of the capacitor 8 is achieved in decimals of an hour. The indicating means 18 has a digital time indicator 22 constructed to digitally indicate 0.01 hr., 0.1 hr., and full hours.

Figure 2:
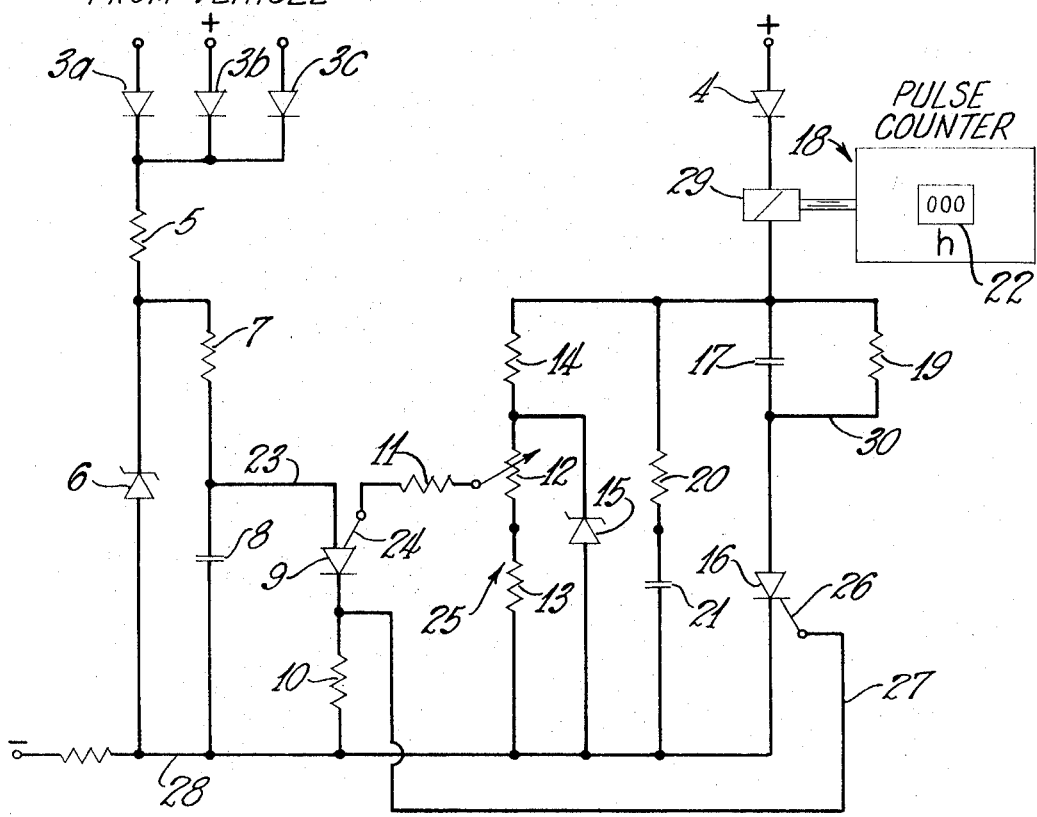
FIG. 2 depicts a detailed wiring diagram of the hourmeter of FIG. 1.

Referring now to FIG. 2, a detailed circuit diagram of the hourmeter is disclosed. The power signals from an electric vehicle (not shown) are applied to the terminals of diodes 3. Since a number of power signals may originate from the electrical equipment of the vehicle whose operating times it may be desirable to jointly count, a number of decoupling diodes 3a, 3b, 3c, are provided to individually accept the individual signals from the electrical equipment. The diodes 3a, 3b, 3c are parallel connected and are in turn series connected to the RC combination including the resistor 7 and the capacitor 8. Since the voltage applied from the vehicle to the storage means 1 may vary under load, the signals from the electrical equipment of the vehicle are stabilized before being applied to the storage means. This stabilization is accomplished by a stabilizing circuit including a resistor 5 and a Zener diode 6.

The capacitor 8 is a very low leakage capacitor and minimizes any loss of charge even in cases of extremely short operating times followed by long intervals of no electrical equipment operation. The capacitor 8 of the storage means is connected with the anode of a programmable unijunction transistor 9 by way of line 23. The programmable unijunction transistor 9 has a control electrode 24, which is maintained at a predetermined potential by way of a signal applied to the electrode 24 from a voltage divider circuit 25 including a resistor 12 and a resistor 13. The signal from the voltage divider 25 is applied to the control electrode 24 by way of a resistor 11 series connected with the control electrode 24. The voltage divider 25 is supplied from a voltage source (not shown) series connected to a diode 4. The positive voltage from the diode 4 is constantly supplied to the divider circuit 25 by way of a resistor 14 series connected with the voltage divider 25 as well as a Zener diode 15 which stabilizes the voltage. Any possible temperature variation of the charging capacity of the capacitor 8 is balanced by the resistors 12 or 13 being temperature dependent resistors. This temperature balancing function may also be provided by connecting separate temperature-dependent resistors in series with the resistors 12 and 13.

The programmable unijunction transistor 9 operates by detecting when the capacitor 8 is charged to the predetermined level, which level is a voltage slightly above the voltage applied to the control electrode 24 of the programmable unijunction transistor 9. When the programmable unijunction transistor 9 upon detecting the predetermined level of the capacitor 8 ignites and the capacitor 8 is discharged through line 27 across the gate 26 of a thyristor 16 producing a control signal to actuate the thyristor 16 into conduction. The capacitor 8 at the same time is discharging through a resistor 10 to a ground line 28. The capacitor 8 is discharged until the current in the programmable unijunction transistor 9 has dropped below a predetermined value of current and the transistor 9 again becomes non-conducting. The voltage at the capacitor 8 also decreases to a very low value of less than 1 volt. The thyristor 16 is conductive, however, because of the control signal applied to it through line 27.

The conductive state of the thyristor 16 causes charging current to pass from the source (not shown) through the diode 4 to the magnetic winding 29 of the pulse counter 18 and therefrom to a capacitor 17. The magnetic winding 29 of the pulse counter 18 actuates the indicator 22 to be switched by one step as a result of the current flow through the winding 29. When the charging current of the capacitor 17 drops to a value below a current level maintaining the thyristor 16 conductive, the thyristor 16 again becomes non-conducting.

The capacitor 17 then discharges through an alternate path 30 across a resistor 19. The resistance value of the resistor 19 is such that the current passing through the resistor 19 is considerably lower than the current which would turn the thyristor 16 to a conductive state. The thyristor 16 will remain non-conductive until it again receives the next ignition pulse from the programmable unijunction transistor 9.

The time required for complete charging of the capacitor 8 to the predetermined value which would turn the programmable unijunction transistor 9 to the conductive state is determined by the values of the resistor 7, the capacitor 8, and the control voltage at the control electrode 24. These values are so chosen as to charge the capacitor 8 and provide a control signal from the programmable unijunction transistor 9 within decimal fractions of 1 hour. The digits of the indicator 22 will then properly indicate decimal fraction of 1 hour directly corresponding to the actual operating time of the elctrical equipment connected to the vehicle.

The vehicles intended for using the present hourmeter generally operate in an environnment which gives rise to numerous interference signals. To desensitize the hourmeter against such interference signals, a desensitizing circuit is utilized. This circuit includes resistor 20 series connected with a capacitor 21 with the pair being parallel connected to the thyristor 16.

Certain other modifications and improvements to the present hourmeter will become obvious to persons skilled in the art. For the sake of conciseness and readability these modifications and improvements are deleted from the present disclosure. It is, however, intended that such improvements and modifications be included in the scope of this application and that it not be limited to the preferred embodiment disclosed herein.

Having described the present invention I claim the following:

1. An hourmeter for indicating the operating time of electrical equipment having short and intermittent operating cycles during which an electrical signal is produced comprising:

Storage means connectable to the electrical equipment for accumulating to a predetermined level the electrical signal produced by the electrical equipment during the operating cycles;

switching means for providing a control signal in response to said storage means accumulating to said predetermined level the electrical signal from the electrical equipment; and indicating means responsive to said control signal from said switching means to provide an indication of the operating time of the electrical equipment.

2. An hourmeter as set forth in claim 1 wherein said switching means includes a programmable unijunction transistor connected to said storage means to provide a discharge path for said storage means upon said programmable unijunction transistor sensing said predetermined level of said storage means and simultaneously providing said control signal to said indicating means.

3. An hourmeter as set forth in claim 2 wherein said storage means includes a capacitor connected to the electrical equipment and being charged to said predetermined level by the electrical signal from the electrical equipment within a predetermined time.

4. An hourmeter as set forth in claim 3 wherein said indicating means includes a pulse counter for providing an indication of elapsed operating time of the equipment and a thyristor series connected to said pulse counter to activate said pulse counter whenever said thyristor is actuated by said control signal from said programmable unijunction transistor.

5. An hourmeter as set forth in claim 4 wherein said pulse counter includes a digital display panel for indicating elapsed time in decimal fractions and said capacitor of said storage means is charged to said predetermined level within a time substantially equivalent to said decimal fraction indicated on said digital display panel.

6. An hourmeter as set forth in claim 1 further including stabilizing means for leveling the electrical signal from the electrical equipment prior to applying it to said storage means.

7. An hourmeter as set forth in claim 6 wherein said stabilizing means includes a Zener diode and wherein said storage means includes a resistor and capacitor combination connected across said Zener diode.

8. An hourmeter as set forth in claim 1 further including temperature compensating means for providing a balancing signal to said switching means to balance any temperature variation in accumulating the electrical signal in said storage means.

9. An hourmeter as set forth in claim 8 wherein:

said switching means includes a programmable unijunction transistor connected to said storage means to provide a discharge path for said storage means upon sensing said predetermined level of said storage means and simultaneously providing said control signal to said indicating means;

said storage means includes a capacitor connected to the electrical equipment through a resistor and is charged by the electrical signal from the electrical equipment to said predetermined level within a predetermined time; and said temperature compensating means includes a temperature dependent resistor connected to said programmable unijunction transistor to change the level at which said programmable unijunction transistor provides said control signal to said indicating means.

10. An hourmeter as set forth in claim 1 further including filtering means for eliminating interference signals between said switching means and said indicating means.

11. An hourmeter for indicating the operating time of electrical equipment comprising:

a storage capacitor connected to the electrical equipment and charged to a predetermined voltage level during the operation of the electrical equipment;

an electronic switch having a conductive state and a non-conductive state and being connected to said capacitor to go between said non-conductive state and said conductive state upon said capacitor being charged to said predetermined voltage level; and a pulse counter connected to said electronic switch to indicate a time increment whenever said electronic switch goes between said non-conductive and said conductive state, said pulse counter including a digital display panel for indicating said time increment in decimal fractions and said capacitor being charged to said predetermined level in a time substantially equivalent to the decimal fraction indicated on said display panel.

* * * * *